United States Patent
Luo et al.

(10) Patent No.: US 8,899,822 B2
(45) Date of Patent: Dec. 2, 2014

(54) WORKING TROUGH AND METHOD FOR MAINTAINING UNIFORM TEMPERATURE OF WORKING FLUID

(71) Applicant: Industrial Technology Research Institute, Hsinchu (TW)

(72) Inventors: Tzuo-Liang Luo, Hsinchu Hsien (TW); En-Sheng Chang, Hsinchu Hsien (TW); Jui-Kuan Lin, Hsinchu Hsien (TW); Yang-Xin Lin, Hsinchu Hsien (TW); Chin-Mou Hsu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/192,024

(22) Filed: Feb. 27, 2014

(65) Prior Publication Data

US 2014/0177381 A1 Jun. 26, 2014

Related U.S. Application Data (62) Division of application No. 12/349,020, filed on Jan. 6, 2009, now Pat. No. 8,696,191.

(30) Foreign Application Priority Data

Oct. 27, 2008 (TW) ................................ 97141134 A (51) Int. Cl.
  *B01F 15/02* (2006.01)
  *B01F 15/00* (2006.01)
  *F15C 1/16* (2006.01)
  *B01F 5/00* (2006.01)
  *B23H 1/02* (2006.01)
  *B23H 1/10* (2006.01)
  *B23H 7/36* (2006.01)

(52) U.S. Cl.
  CPC ............... *B01F 5/0062* (2013.01); *B23H 1/02* (2013.01); *B23H 1/10* (2013.01); *B23H 7/36* (2013.01)
  USPC ...................... 366/132; 366/165.1; 366/165.2; 366/165.3; 366/165.4; 366/165.5; 366/177.1; 366/181.6; 366/131; 366/154.1; 366/136; 366/137; 137/808; 137/811; 137/812; 137/813

(58) Field of Classification Search
  USPC ........... 366/131, 132, 165.2, 154.1, 136, 137, 366/161.1–165.5, 177.1, 181.6; 137/808, 137/811, 812, 813
  See application file for complete search history.

(56) References Cited

U.S. PATENT DOCUMENTS

| | | | |
|---|---|---|---|
| 2,588,774 A | 3/1952 | Smith | |
| 3,541,297 A | 11/1970 | Sunnen et al. | |
| 4,139,990 A * | 2/1979 | Barnes | 62/5 |
| 5,114,122 A * | 5/1992 | Hnat | 266/186 |
| 5,630,951 A | 5/1997 | Peters | |
| 6,186,657 B1 * | 2/2001 | Fuchsbichler | 366/165.4 |

FOREIGN PATENT DOCUMENTS

| | | |
|---|---|---|
| CN | 2273233 Y | 1/1998 |
| JP | 3-71829 A | 7/1991 |
| TW | M285409 | 1/2006 |

* cited by examiner

*Primary Examiner* — Richard Crispino
*Assistant Examiner* — Matthew Hoover
(74) *Attorney, Agent, or Firm* — Rabin & Berdo, P.C.

(57) ABSTRACT

The invention provides a working trough and a method for maintaining a uniform temperature of a working fluid. The working trough is applied to an electrical discharge machine that performs wire cutting using the working fluid. The method for maintaining a uniform temperature of the working fluid is applied to the working trough and characterized by forming opening structures in a receiving slot of the working trough such that a spiral swirl having a predetermined height is allowed to be formed in the working fluid, thereby maintaining a uniform temperature of the working fluid in the receiving slot when a wire cutting process is performed in the working fluid by the electrical discharge machine. The disturbance of the spiral swirl also facilitates the discharge of scraps. The present invention further has an advantage of low cost.

11 Claims, 5 Drawing Sheets

WORKING TROUGH AND METHOD FOR MAINTAINING UNIFORM TEMPERATURE OF WORKING FLUID

CROSS-REFERENCE TO RELATED APPLICATIONS

This application is a divisional of co-pending application Ser. No. 12/349,020, filed Jan. 6, 2009, and the right of priority of parent application is and was claimed under 35 USC §119 of Taiwan Application No. 97141134, filed Oct. 27, 2008, the entire disclosure of which is incorporated herein by reference.

BACKGROUND OF THE INVENTION

1. Field of the Invention

The present invention relates generally to working troughs, and more particularly to a working trough and a method for maintaining a uniform temperature of a working fluid applicable to an electrical discharge machine that performs wire cutting using the working fluid.

2. Description of Related Art

In recent years, technology products with minimized size and high precision have become a trend Minimization and high precision of the products are achieved through a variety of techniques, which are collectively referred to as micro system technologies (MST). The micro system technologies are applied in a variety of fields such as nano-technology, photoelectric communication and biomedical science and technology. To meet the requirements of the micro system technologies and continuously growing applications, micro processing methods of components or dies are strongly needed. When the product size goes into a micro/nano level, product system designs seriously relies on the micro processing capabilities.

Wire-cutting electrical discharge machining (WEDM) is one of a micro processing methods, which melts the work piece and cuts shape by spark discharges occurring when the wire electrode is moved close to the work piece. There are no cutting forces used since there is no direct contact between the wire electrode and the work piece. In addition, no electrode consumption occurs and accordingly there is no processing error caused by electrode consumption. Therefore, the WEDM is an appropriate micro processing method. The WEDM can be divided into an immersion type and a non-immersion type.

Figure 1:
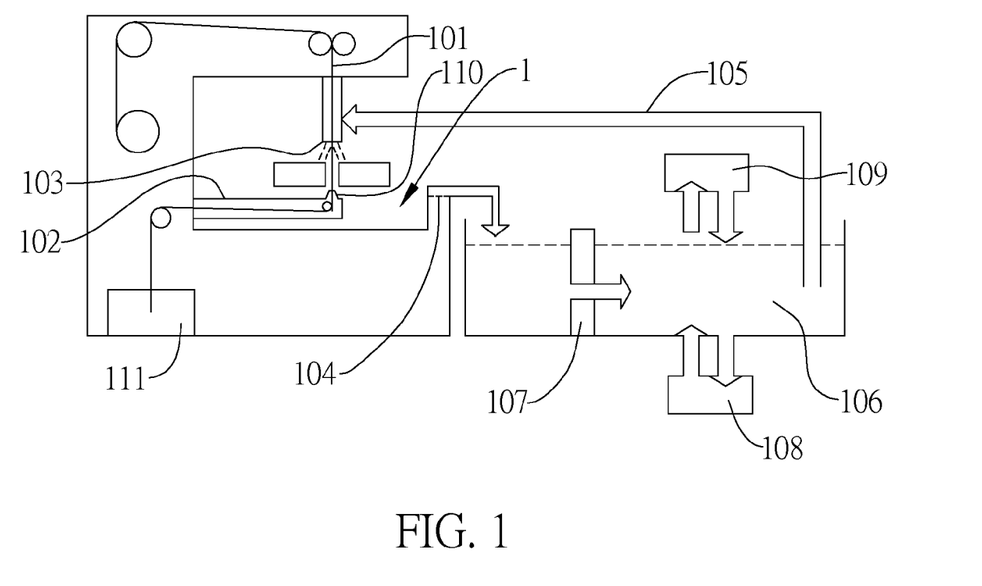
FIG. 1 is a diagram of a wire cutting electrical discharge machine system.
Figure 2:
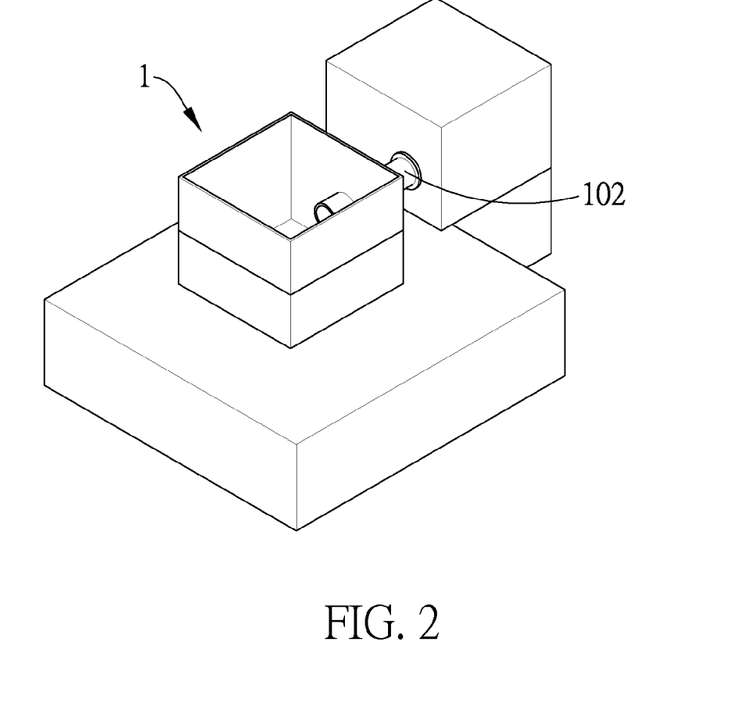
FIG. 2 is a simplified view of a wire cutting electrical discharge machine.

For the immersion type, both the work piece and the wire electrode are immersed in deionized water or other appropriate working fluid with high dielectric constant for preventing electrochemical or electrolysis reactions. Further, scraps can be flushed away by the working fluid. Before an immersion type WEDM starts, the working trough is filled with the working fluid. Then, during the machining process, external working fluid in such as a cooling trough is drawn by the upper head of the electrical discharge machine and guided into the working trough along with cycling of the wire electrode, thereby reducing the high temperature generated during the electrical discharge machining and flushing away scraps. Superfluous working fluid flows away from the upper side of the working trough or through overflow holes. FIG. 1 is a diagram showing a wire cutting electrical discharge machine system and FIG. 2 is a simplified view of a wire cutting electrical discharge machine. As shown in the drawings, the system comprises a working trough 1, a cutting wire 101, a lower extending arm 102, an upper head 103, an overflow hole 104, an external fluid storage tank 106, a filter 107, an ion exchanger 108, a cooler 109 and a waste wire box 111. An arrow 105 in the drawing denotes direction of movement of the working fluid. In this technique, the working fluid for machining flows from the upper head 103 into the working trough 1 along with cycling of the cutting wire 101. The superfluous working fluid is discharged through the overflow hole 104, filtered by the filter 107 and cooled by the cooler 109. After the ions of the working fluid are removed by the ion exchanger 108 and possibly additional new fluid (not shown) is added, the fluid flows into the working trough 1 again from the upper head 103 along with the cutting wire 101. The cutting wire 101 extends from the upper head 103, enters into the lower head 110 and passes through the lower extending arm 102 and finally enters into the waste line box 111.

As described above, during operation of the electrical discharge machine, the temperature of the cutting area increases due to electrical discharges, resulting in uneven temperature of the working fluid in the working trough. That is, the temperature of the cutting area varies with time. Therefore, the temperature in this area is in a transient state instead of in a steady state and it reaches a steady state when the temperature of the whole trough reaches a thermal balance with the ambient. In simple words, in the control volume of the whole trough, the temperature of the trough reaches a steady state only when the heat generated by the heat source is equal to the heat dissipated out to the ambient, which however requires a long time. Uneven temperature distribution in the trough and the characteristic of the transient state of the temperature can lead to heat distortion of the lower extending arm, thereby adversely affecting the machining precision. The machining error caused thereby is difficult to be corrected through additional shift or compensation. On the other hand, as the volume of the working fluid guided into the trough during machining is relatively small, the movement in the trough driven by the working fluid guided into the trough during machining is relatively little. As a result, scraps can easily sink to the bottom of the trough instead of being flushed away.

Figure 3:
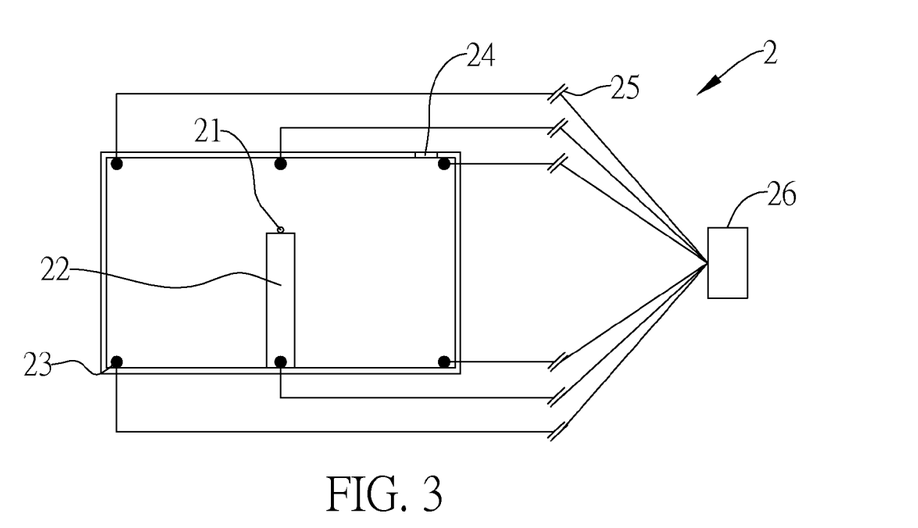
FIG. 3 is a simplified top view of a conventional temperature control trough system.

Accordingly, as shown in FIG. 3, Taiwan Patent No. M285409 discloses another wire cutting electrical discharge machine system, which comprises a working trough 2, a cutting wire 21, a lower extending arm 22, a plurality of temperature sensors 23, an overflow hole 24, a plurality of throttles 25, and a cooling control device 26, wherein the temperature sensors 23 senses the temperature of the fluid and transmits temperature signals to the cooling control device 26 such that the cooling control device 26 can control the temperature of the fluid through the throttles 25 or by using frequency conversion technique, thereby maintaining a uniform temperature of the fluid in the working trough. However, the use of the sensors 23, the cooling control device 26 and the throttles 25 increase the cost. In addition, since the positions of the sensors 23 are fixed, phenomenon of uneven temperature can still occur in a short time. Further, the system lacks a mechanism for discharging scraps.

Therefore, how to provide a working trough and a method applicable in a wire cutting electrical discharge machine for maintaining a uniform temperature of the working fluid in the working trough and facilitating the discharge of scraps and having a low cost has become a critical issue for the industry.

SUMMARY OF THE INVENTION

According to the above drawbacks, the present invention provides a working trough and a method for maintaining a uniform temperature of a working fluid, which can keep the working fluid in the working trough at a uniform temperature.

The present invention provides a working trough and a method for maintaining a uniform temperature of a working fluid, which can facilitate the discharge of scraps.

The present invention provides a working trough and a method for maintaining a uniform temperature of a working fluid, which has a low cost.

The present invention provides a working trough for maintaining a uniform temperature of a working fluid, wherein the working trough is applied to an electrical discharge machine that performs wire cutting using the working fluid, the working trough comprising: a base body having a receiving slot; at least a first opening formed on the base body; and at least a second opening formed on the base body; wherein the first opening is used for guiding the working fluid into the receiving slot and the second opening is used for guiding the working fluid out of the receiving slot such that a spiral swirl having a predetermined height is allowed to be formed in the working fluid in the receiving slot, thereby maintaining a uniform temperature of the working fluid in the receiving slot when a wire cutting process is performed in the working fluid by the electrical discharge machine.

The present invention further provides a method for maintaining a uniform temperature of a working fluid, wherein the method is applied to the above-described working trough, the method comprising forming a spiral swirl having a predetermined height in the receiving slot of the base body of the working trough so as to maintain a uniform temperature of the working fluid in the receiving slot when a wire cutting process is performed in the working fluid by an electrical discharge machine.

Compared with the prior art, the present invention mainly involves disposing on the base body of a work trough at least a first opening for guiding the working fluid into the receiving slot and at least a second opening for guiding the working fluid out of the receiving slot, thereby forming a spiral swirl having a predetermined height in the receiving slot so as to maintain a uniform temperature of the working fluid in the receiving slot when a wire cutting processes is performed by an electrical discharge machine in the working fluid. Meanwhile, the disturbance of the spiral swirl facilitates the discharge of scraps. Further, the working trough of the present invention has an advantage of low cost.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification.

Figure 4:
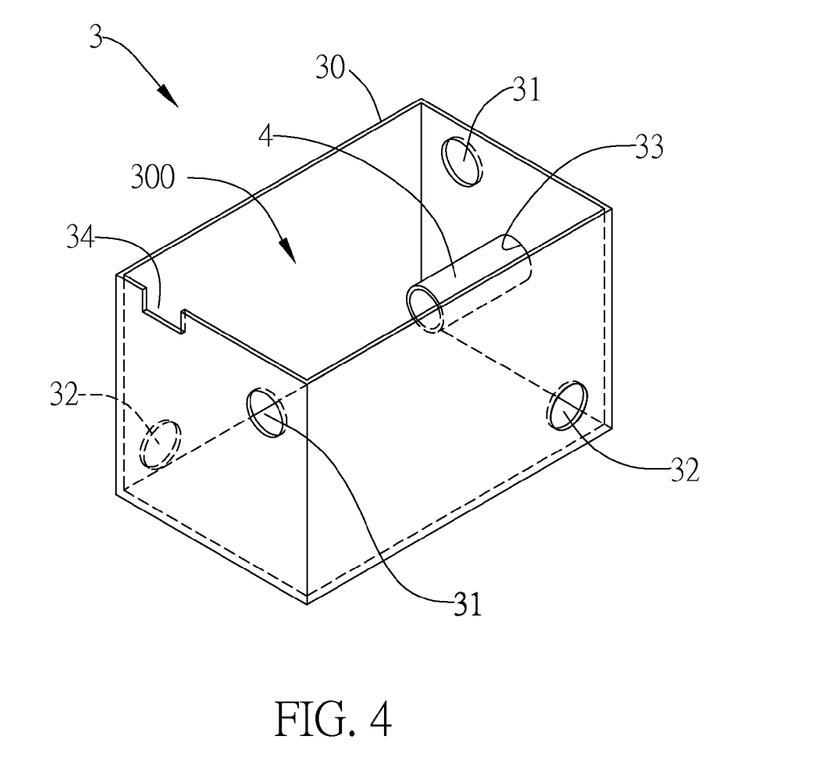
FIG. 4 is a perspective view of a working trough for maintaining a uniform temperature of a working fluid according to a first embodiment of the present invention.

FIG. 4 shows a working trough for maintaining a uniform temperature of a working fluid according to a first embodiment of the present invention. The working trough 3 of the present invention is applied to a conventional electrical discharge machine (not shown) that performs wire cutting using a working fluid with a high dielectric constant. The working trough 3 comprises a base body 30 with a receiving slot 300, at least a first opening 31 disposed on the base body 30 for guiding the working fluid into the receiving slot 300, at least a second opening 32 disposed on the base body 30 for guiding the working fluid out of the receiving slot 300, an opening 33 for disposing of an lower extending arm 4, and an overflow hole 34 disposed on the base body 30 for discharging superfluous working fluid in the receiving slot 300. It should be noted that relative position, size and number of any component in the drawings are for illustration purpose only and not intended to limit the scope of the invention. The components of the working trough 3 are described in detail as follows.

The base body 30 has a receiving slot 300 disposed therein. The shape, size and position of the receiving slot 3 can be adjusted according to the practical need.

In the present embodiment, there are two first openings 31 that are respectively disposed on two opposed side surfaces of the base body 30 and close to the upper edges thereof and are free from being in alignment with each other. The size, position, shape and number of the first openings 31 can be adjusted according to the practical need. The first openings 31 are used for guiding the working fluid into the receiving slot 300 for further forming a spiral swirl in the receiving slot 300. The temperature of the working fluid guided through the first openings 31 can be determined according to the practical demand. The working fluid may come from an external fluid source and/or an external fluid storage tank and has been filtered. The working fluid can be, for example, water. Further, a cooling element or device can be used for controlling the temperature of the fluid. The working fluid can flow through the first openings 31 at any appropriate speed, as long as it can lead to an appropriate flow or disturbance of the working fluid in the receiving slot 300 so as to form a spiral swirl for maintaining a uniform temperature of the working fluid and further facilitating the discharge of scraps.

In the present embodiment, there are two second openings 32 that are disposed on the other two opposed side surfaces of the base body 30 and close to the lower edges thereof and are free from being in alignment with each other. The size, position, shape and number of the second openings 32 can be adjusted according to the practical need. The second openings 32 should be matched with the first openings 31. For example, the total flow of the working fluid through the second openings 32 must be equal to or (slightly) smaller than the total flow of the working fluid through the first openings 31. The second openings 32 are configured by size, position, shape and number such that the working fluid guided through the first openings 31 can form a specific flow field, i.e., a spiral swirl, thereby maintaining a uniform temperature of the working fluid in the receiving slot 300 and efficiently discharging scraps produced during the wire cutting process.

The opening 33 is used for disposing of the lower extending arm 4 such that the lower extending arm 4 can be extended into the receiving slot 300 for performing the wire cutting process. The size of the opening 33 can be determined by the size of the lower extending arm 4. The position of the opening 33 can be determined according to the electrical discharge machine, and the opening 33 can be disposed on any surface of the base body 30. It should be noted that after the lower extending arm 4 is disposed to the working trough 3, the base body 30 and the lower extending arm 4 are tightly connected so as to prevent leakage of the working fluid.

The position of the overflow hole 34 depends on the requirement of the electrical discharge machine and the working trough 3, which is not limited to the drawing. The overflow hole 34 is used for discharging superfluous working fluid and maintaining the working fluid in the receiving slot 300 at a maximum acceptable level, thereby preventing the overflowed working fluid from splashing on the electrical discharge machine that may cause damage of the electrical components of the electrical discharge machine and keeping the working place clean and dry.

Figure 5:
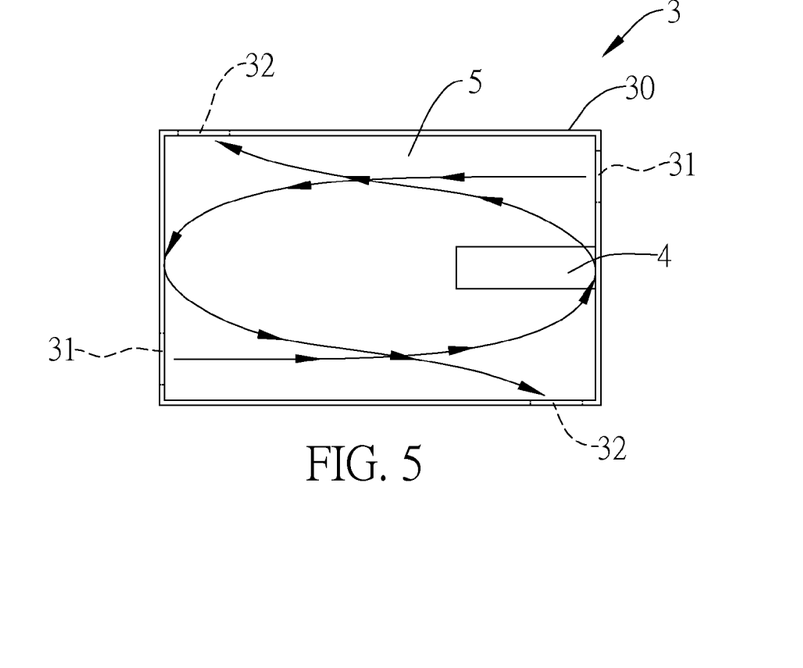
FIG. 5 is a diagram showing movement of the working fluid in the working trough according to a first embodiment of the present invention.

FIG. 5 shows movement of the working fluid in the working trough according to a first embodiment of the present invention. Through configuration of the first openings 31 and the second openings 32 by relative positions, sizes, numbers and/or shapes, the working fluid 5 forms a spiral swirl having a predetermined height in the receiving slot 300, as denoted by arrows in the drawing. In other embodiments, as described later, the spiral swirl is allowed be formed through configuration of the base body by size and/or shape as well as the configuration the first openings 31 and the second openings 32 by relative positions, sizes, numbers and/or shapes.

Figure 6:
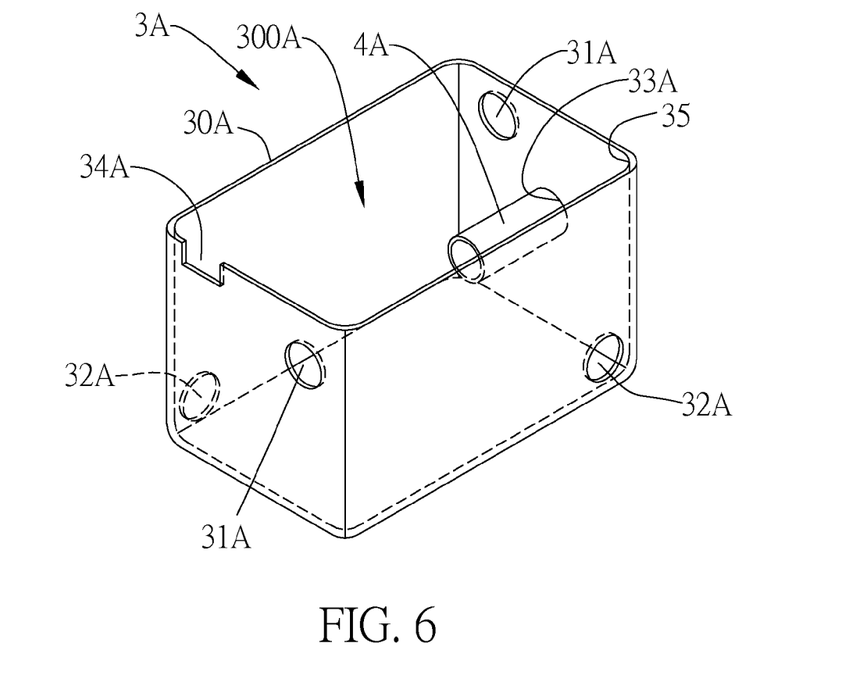
FIG. 6 is a perspective view of a working trough for maintaining a uniform temperature of the working fluid according to a second embodiment of the present invention.

FIG. 6 shows a working trough for maintaining a uniform temperature of a working fluid according to a second embodiment of the present invention. The working trough 3A of the present invention is applied to a conventional electrical discharge machine (not shown) that performs wire cutting using a working fluid with a high dielectric constant. The electrical discharge machine has a lower extending arm 4A for performing a wire cutting process in the working trough 3A of the present invention.

The working trough 3A comprises a base body 30A with a receiving slot 300A, at least a first opening 31A disposed on the base body 30A for guiding the working fluid into the receiving slot 300A, at least a second opening 32A disposed on the base body 30A for guiding the working fluid out of the receiving slot 300A, an opening 33A for disposing of the lower extending arm 4A, and an overflow hole 34A disposed on the base body 30A for discharging superfluous working fluid in the receiving slot 300A. As described in the first embodiment, the first opening 31A is used for guiding the working fluid into the receiving slot. The temperature of the working fluid guided through the first opening 31A can be determined according to the practical demand. The working fluid may come form an external fluid source and/or an external fluid storage tank and has been filtered. Further, a cooling element or device can be used for controlling the temperature of the working fluid. As shown in FIG. 6, there are two first openings 31A and two second openings 32A, wherein the first openings 31A are respectively disposed on two opposed side surfaces of the base body 30A and close to the upper edges thereof and are free from being in alignment with each other, and the second openings 32A are respectively disposed on the other two opposed side surfaces of the base body 30A and close to the lower edges thereof and are free from being in alignment with each other. The sizes, positions, shapes and numbers of the first openings 31A and the second openings 32A can be changed in practice, as long as the working fluid can form a spiral swirl in the receiving slot 300A of the base body 30A. The first openings 31A and the second openings 32A should be matched with each other. For example, the total flow of the working fluid through the second openings 32A must be equal to or (slightly) smaller than the total flow of the working fluid through the first openings 31A such that the fluid can form a specific flow field, i.e. a spiral swirl, thereby maintaining a uniform temperature of the working fluid in the receiving slot 300A and efficiently discharging scraps produced during the wire cutting process. The opening 33A is used for disposing of the lower extending arm 4A. The size of the opening 33A can be determined by the size of the lower extending arm 4A. The position of the opening 33A can be determined according to the electrical discharge machine, and the opening 33A can be disposed on any surface of the base body 30A. It should be noted that after the lower extending arm 4A is disposed to the working trough 3A, the base body 30A and the lower extending arm 4A are tightly connected so as to prevent leakage of the working fluid. The position of the overflow hole 34A depends on the requirement of the electrical discharge machine and the working trough 3A, which is not limited to the drawing. The overflow hole 34A is used for discharging superfluous working fluid and maintaining the working fluid in the receiving slot 300A at a maximum acceptable level, thereby preventing the overflowed working fluid from splashing on the electrical discharge machine that may cause damage of the electrical components of the electrical discharge machine and keeping the working place clean and dry.

Figure 7:
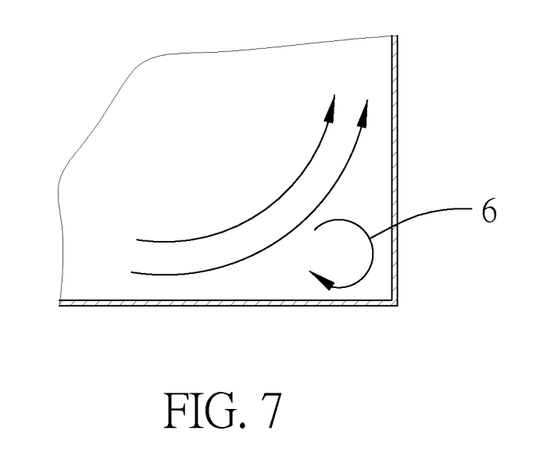
FIG. 7 is a partially sectional view of the base body of the working trough according to the first embodiment of the present invention.

A big difference of the present embodiment from the first embodiment is the structure of the base body 30A. In the present embodiment, as shown in FIG. 6, a round angle 35 is formed at a position where any two or more vertical walls meet so as to ensure smooth flow of the working fluid in the receiving slot 300A, thereby preventing formation of a corner vortex at a position where two walls meet as shown in FIG. 7 so as to avoid accumulation of scraps at the position and accordingly facilitating the discharge of scraps, wherein FIG. 7 is a partially sectional view of the base body 30 according to the first embodiment. The curve radius of the round angle 35 is determined according to the size and operation of the working trough 3A. Accordingly, the receiving slot 300A may be of any appropriate shape such as a cylindrical shape, a spherical shape or a semi-spherical shape free of sharp angles.

Figure 8A:
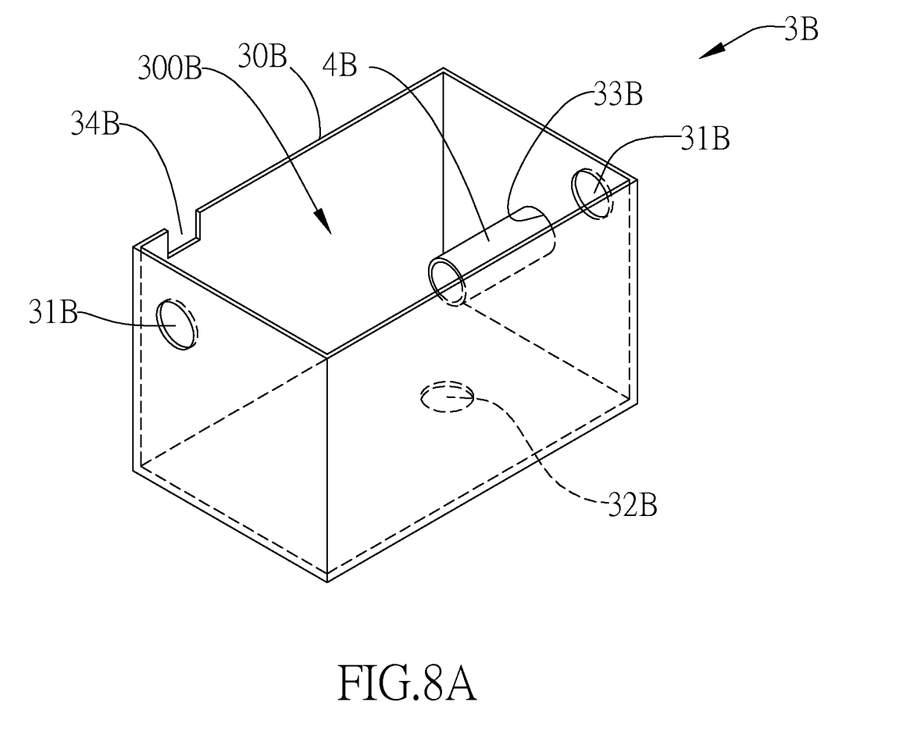
FIGS. 8A and 8B are perspective views of a working trough for maintaining a uniform temperature of the working fluid according to a third embodiment of the present invention.
Figure 8B:
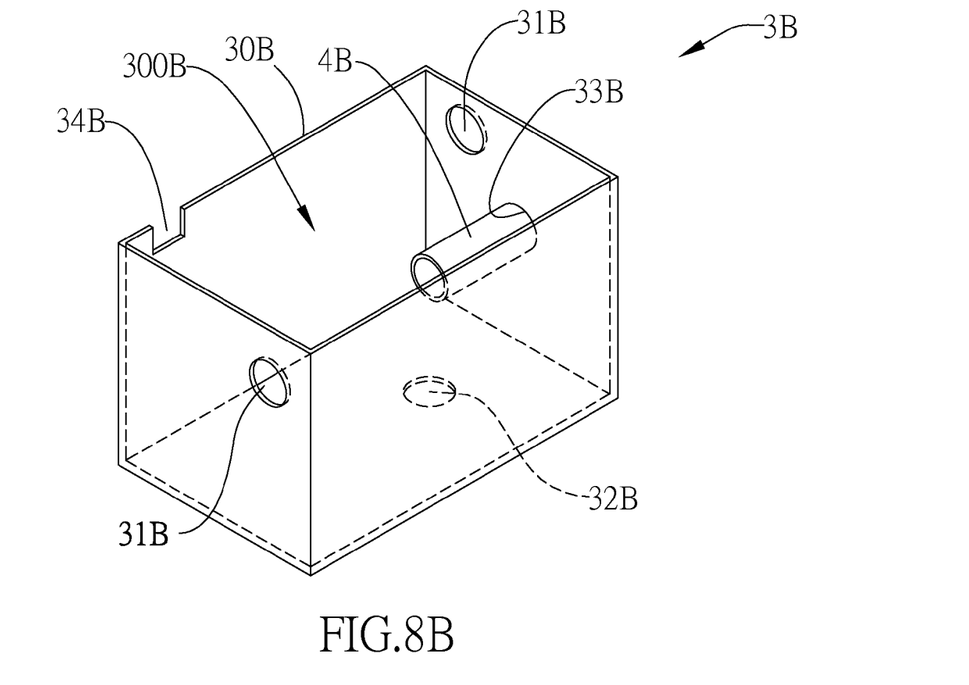

As shown in FIGS. 8A and 8B, a working trough for maintaining a uniform temperature of a working fluid according to a third embodiment of the present invention is shown. The working trough 3B of the present invention is applied to a conventional electrical discharge machine (not shown) that performs wire cutting using a working fluid with a high dielectric constant. The electrical discharge machine has a lower extending arm 4B for performing a wire cutting process in the working trough 3B of the present invention.

The working trough 3B comprises a base body 30B with a receiving slot 300B, at least a first opening 31B disposed on the base body 30B for guiding the working fluid into the receiving slot 300B, at least a second opening 32B disposed on the base body 30B for guiding the working fluid out of the receiving slot 300B, an opening 33B for disposing of the lower extending arm 4B, and an overflow hole 34B disposed on the base body 30B for discharging superfluous working fluid in the receiving slot 300B. As described in the first embodiment, the first opening 31B is used for guiding the working fluid into the receiving slot. The temperature of the working fluid guided through the first opening 31B can be determined according to the practical demand. The working fluid may come form an external fluid source and/or an external fluid storage tank and has been filtered. Further, a cooling element or device can be used for controlling the temperature of the working fluid. Different from the first and second embodiments, there is only one second opening 32B in the present embodiment and the second opening 32B is disposed on the bottom of the base body 30B. The sizes, positions, shapes and numbers of the first opening 31B and the second opening 32B can be changed in practice, as long as the working fluid can form a spiral swirl in the receiving slot 300B of the base body 30B. The first opening 31B and the second opening 32B should be matched with each other. For example, the total flow of the working fluid through the second opening 32B must be equal to or (slightly) smaller than the total flow of the working fluid through the first opening 31B such that the fluid can form a specific flow field, i.e. a spiral swirl, thereby maintaining a uniform temperature of the working fluid in the receiving slot 300B and efficiently discharging scraps produced during the wire cutting process. The opening 33B is used for disposing of the lower extending arm 4B. The size of the opening 33B can be determined by the size of the lower extending arm 4B. The position of the opening 33B can be determined according to the electrical discharge machine, and the opening 33B can be disposed on any surface of the base body 30B. It should be noted that after the lower extending arm 4B is disposed to the working trough 3B, the base body 30B and the lower extending arm 4B are tightly connected so as to prevent leakage of the working fluid. The position of the overflow hole 34B depends on the requirement of the electrical discharge machine and the working trough 3B, which is not limited to the drawing. The overflow hole 34B is used for discharging superfluous working fluid and maintaining the working fluid in the receiving slot 300B at a maximum acceptable level, thereby preventing the overflowed working fluid from splashing on the electrical discharge machine that may cause damage of the electrical components of the electrical discharge machine and keeping the working place clean and dry.

The base body 30B of the working trough 3B can be any one of the first embodiment and the second embodiment, with or without round angles. The volume of the working fluid stored in the receiving slot 300B is far larger than the volume of the working fluid guided through the first openings 31B. In this circumstance, the movement of the working fluid in the receiving slot 300B driven by the working fluid guided through the first openings 31B is relatively little. Therefore, in order to make the working fluid in the receiving slot 300B form a spiral swirl for maintaining a uniform temperature of the working fluid and facilitating the discharge of scraps, the second opening 32B is disposed under the wire cutting area, i.e., the end of the lower extending arm 4B. Meanwhile, through configuration of the first opening 31B and the second opening 32B, a coriolis force produced in the Earth's rotation can be used to strengthen the flow of the working fluid, thereby forming and strengthening a spiral swirl. As shown in FIG. 8A, in the northern hemisphere, two first openings 31B and one second opening 32B are disposed in the receiving slot 300B of the base body 30B. Through configuration of the first openings 31B and the second opening 32B, a smoothly flowing spiral swirl is allowed to be formed and strengthened by the coriolis force, thereby maintaining a uniform temperature of the working fluid in the receiving slot 300B and facilitating the discharge of scraps. On the other hand, in the southern hemisphere, a configuration as shown in FIG. 8B can be applied to form a smoothly flowing spiral swirl, thereby maintaining a uniform temperature of the working fluid in the receiving slot 300B and facilitating the discharge of scraps.

Figure 9:
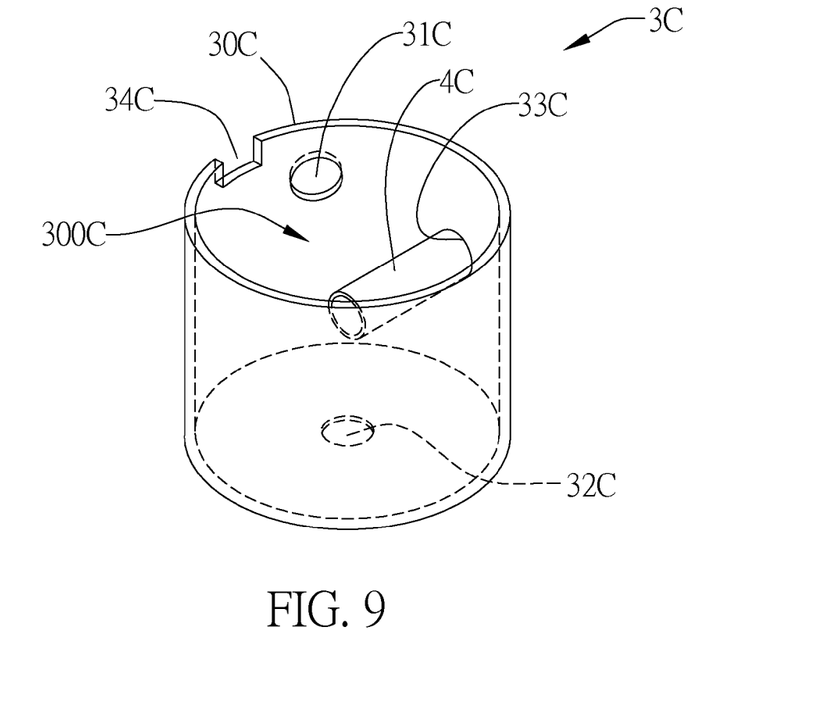
FIG. 9 is a perspective view of a working trough for maintaining a uniform temperature of the working fluid according to a fourth embodiment of the present invention.

As shown in FIG. 9, a working trough for maintaining a uniform temperature of a working fluid according to a fourth embodiment is shown. The working trough 3C of the present invention is applied to a conventional electrical discharge machine (not shown) that performs wire cutting using a working fluid with a high dielectric constant. The electrical discharge machine has a lower extending arm 4C for performing a wire cutting process in the working trough 3C of the present invention.

The working trough 3C comprises a base body 30C with a receiving slot 300C, at least a first opening 31C disposed on the base body 30C for guiding the working fluid into the receiving slot 300C, at least a second opening 32C disposed on the base body 30C for guiding the working fluid out of the receiving slot 300C, an opening 33C for disposing of the lower extending arm 4C, and an overflow hole 34C disposed on the base body 30C for discharging superfluous working fluid in the receiving slot 300C. As described in the first embodiment, the first opening 31C is used for guiding the working fluid into the receiving slot. The temperature of the working fluid guided through the first opening 31C can be determined according to the practical demand. The working fluid may come form an external fluid source and/or an external fluid storage tank and has been filtered. Further, a cooling element or device can be used for controlling the temperature of the working fluid. In the present embodiment, there is one first opening 31C that is disposed on the side surface of the base body 30C and close to the upper edge and there is one second opening 32C that is disposed on the bottom of the base body 30C. The sizes, positions, shapes and numbers of the first opening 31C and the second opening 32C can be changed in practice, as long as the working fluid can form a spiral swirl in the receiving slot 300C of the base body 30C. The first opening 31C and the second opening 32C should be matched with each other. For example, the total flow of the working fluid through the second opening 32C must be equal to or (slightly) smaller than the total flow of the working fluid through the first opening 31C such that the fluid can form a specific flow field, i.e. a spiral swirl, thereby maintaining a uniform temperature of the working fluid in the receiving slot 300C and efficiently discharging scraps produced during the wire cutting process. The opening 33C is used for disposing of the lower extending arm 4C. The size of the opening 33C can be determined by the size of the lower extending arm 4C. The position of the opening 33C can be determined according to the electrical discharge machine, and the opening 33C can be disposed on any surface of the base body 30C. It should be noted that after the lower extending arm 4C is disposed to the working trough 3C, the base body 30C and the lower extending arm 4C are tightly connected so as to prevent leakage of the working fluid. The position of the overflow hole 34C depends on the requirement of the electrical discharge machine and the working trough 3B, which is not limited to the drawing. The overflow hole 34C is used for discharging superfluous working fluid and maintaining the working fluid in the receiving slot 300C at a maximum acceptable level, thereby preventing the overflowed working fluid from splashing on the electrical discharge machine that may cause damage of the electrical components of the electrical discharge machine and keeping the working place clean and dry.

In the present embodiment, the receiving slot 300C of the base body 30C may have a cylindrical shape, a spherical shape, a semi-spherical shape, or any appropriate shape that is symmetric about the center line thereof. The volume of the working fluid stored in the receiving slot 300C is far larger than the volume of the working fluid guided through the first openings 31C. In this circumstance, the movement of the working fluid in the receiving slot 300C driven by the working fluid guided through the first opening 31C is relatively little. Therefore, in order to make the working fluid in the receiving slot 300C form a spiral swirl for maintaining a uniform temperature of the working fluid and facilitating the discharge of scraps, the second opening 32C is disposed under the wire cutting area, i.e., the end of the lower extending arm 4C. Meanwhile, through configuration of the first opening 31B and the second opening 32C, a coriolis force produced in the Earth's rotation can be used to strengthen the flow of the working fluid, thereby forming and strengthening a spiral swirl. The first opening 31C can have any appropriate size, shape, position and number. The position of the first opening 31C is not affected by whether it is in the northern or southern hemisphere. Through configuration of the first opening 31C and the second opening 32C, a spiral swirl is allowed to be formed in the receiving slot 300C by the coriolis force. In the northern hemisphere, the swirl rotates clockwise, while in the southern hemisphere, the swirl rotates counter-clockwise.

It should be noted that the movement of the working fluid in the second to fourth embodiments is similar to that of FIG. 5 of the first embodiment, those skilled in the art can easily deduce the movement of the working fluid in the second to fourth embodiments from FIG. 5 of the first embodiment. Therefore, detailed description of the movement of the working fluid in the second to fourth embodiments is omitted here.

The present invention further provides a method for maintaining a uniform temperature of a working fluid. The method is applied to the working trough as described above, which mainly involves forming a spiral swirl having a predetermined height in the receiving slot of the base body of the working trough so as to maintain a uniform a temperature of the working fluid in the receiving slot when a wire cutting process is performed by an electrical discharge machine in the working fluid.

Therefore, the present invention mainly involves disposing on the base body of a work trough at least a first opening for guiding the working fluid into the receiving slot and at least a second opening for guiding the working fluid out of the receiving slot, thereby forming a spiral swirl having a predetermined height in the receiving slot so as to maintain a uniform temperature of the working fluid in the receiving slot when a wire cutting processes is performed by an electrical discharge machine in the working fluid. Meanwhile, the disturbance of the spiral swirl facilitates the discharge of scraps. Further, the working trough of the present invention has an advantage of low cost.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A method for maintaining a uniform temperature of a working fluid, wherein the method is applied to an electrical discharge machine that performs wire cutting using the working fluid, the method comprising the following steps:
   providing a working trough having a base body with a receiving slot, at least a first opening disposed on the base body and at least a second opening disposed on the base body; and
   guiding the working fluid into the receiving slot through the first opening and guiding the working fluid out of the receiving slot through the second opening such that a spiral swirl having a predetermined height is allowed to be formed in the working fluid in the receiving slot, thereby maintaining a uniform temperature of the working fluid in the receiving slot when a wire cutting process is performed in the working fluid by the electrical discharge machine.

2. The method of claim 1, wherein the working fluid has a high dielectric constant.

3. The method of claim 1, wherein the electrical discharge machine has a lower extending arm and an opening is formed on any surface of the base body for disposing of the lower extending arm.

4. The method of claim 1, wherein through configuration of the first and second openings by relative positions, sizes, numbers and/or shapes, the spiral swirl having a predetermined height is allowed to be formed in working fluid in the working trough.

5. The method of claim 1, wherein through configuration of the base body by size and/or shape and configuration of the first and second openings by relative positions, sizes, numbers and/or shapes, the spiral swirl having a predetermined height is allowed to be formed in working fluid in the working trough.

6. The method of claim 1, wherein each of the first and second openings has at least two in number, the at least two first openings are respectively disposed on two opposed side surfaces of the base body and close to upper edges thereof and free from being in alignment with each other, and the at least two second openings are respectively disposed on the other two opposed side surfaces of the base body and close to lower edges thereof and free from being in alignment with each other.

7. The method of claim 1, wherein a umber of the first openings us at least two and that of the second opening is at least one, the at least two first openings are respectively disposed on two opposed side surfaces of the base body and close to upper edges thereof and free from being in alignment with each other, and the at least one second opening is disposed on the bottom of the base body.

8. The method of claim 6, wherein a round angle is formed at a position where at least two vertical walls of the base body meet.

9. The method of claim 7, wherein the base body has a hollow cylindrical shape.

10. The method of claim 1, wherein the second opening is further used for discharging scraps produced during the wire cutting process of the electrical discharge machine in the working fluid.

11. The method of claim 1, further comprising an overflow hole disposed on the base body for discharging superfluous working fluid in the receiving slot.

* * * * *